(12) United States Patent  (10) Patent No.: US 9,098,928 B2
Mizuta  (45) Date of Patent: Aug. 4, 2015

(54) IMAGE-PROCESSING SYSTEM AND IMAGE-PROCESSING METHOD

(75) Inventor: Masaki Mizuta, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 223 days.

(21) Appl. No.: 13/409,538

(22) Filed: Mar. 1, 2012

(65) Prior Publication Data

US 2012/0154592 A1  Jun. 21, 2012

Related U.S. Application Data

(62) Division of application No. 12/244,344, filed on Oct. 2, 2008, now Pat. No. 8,155,385.

(30) Foreign Application Priority Data

Oct. 15, 2007  (JP) .................................. 2007-267886

(51) Int. Cl.
   *B60R 11/04*  (2006.01)
   *G06T 11/00*  (2006.01)
(52) U.S. Cl.
   CPC ................ *G06T 11/00* (2013.01); *B60R 11/04* (2013.01); *B60R 2300/60* (2013.01); *B60R 2300/607* (2013.01)
(58) Field of Classification Search
   CPC ........................... B60R 2300/607; B60R 1/00
   USPC ................................... 382/104; 348/211, 148
   See application file for complete search history.

(56) References Cited

U.S. PATENT DOCUMENTS 6,539,288 B2 *  3/2003  Ishida et al. ...................... 701/1
7,027,616 B2 *  4/2006  Ishii et al. ...................... 382/104

(Continued)

FOREIGN PATENT DOCUMENTS

JP       2003-169323       6/2003
JP       2003169323 A  *  6/2003

OTHER PUBLICATIONS

Machine translation [on-line] of JP 2003-169323, retrieved on Sep. 6, 2013. Retrieved from the Internet: http://www4.ipdl.inpit.go.jp/Tokujitu/PAJdetail.ipdl?N0000=60&N0120=01&N2001=2&N3001=2003-169323.*

*Primary Examiner* — Matthew Bella
*Assistant Examiner* — Dennis Rosario
(74) *Attorney, Agent, or Firm* — Brinks Gilson & Lione

(57) ABSTRACT

A vehicle-periphery-image-providing system may include an image-capturing unit, a viewpoint-change unit, an image-composition unit, an object-detection unit, a line-width-setting unit, and a line-selection unit. The image-capturing units, such as cameras, capture images outside a vehicle periphery and generate image-data items. The viewpoint-change unit generates a bird's-eye-view image for each image-data item based on the image-data item so that end portions of the real spaces corresponding to two adjacent bird's-eye-view images overlap each other. The image-composition unit generates a bird's-eye-view-composite image by combining the bird's-eye-view images according to a predetermined layout. The object-detection unit detects an object existing in the real space corresponding to a portion where the bird's-eye-view images of the bird's-eye-view-composite image are joined to each other. The line-width-setting unit sets the width of the line image corresponding to the joining portion. The line-selection unit adds a line image having the set width to an overlap portion of one of the bird's-eye-view images.

5 Claims, 12 Drawing Sheets

(56) References Cited

U.S. PATENT DOCUMENTS

| | | |
|---|---|---|
| 7,126,460 B2 * | 10/2006 | Yamada .................. 340/435 |
| 7,161,616 B1 | 1/2007 | Okamoto et al. |
| 7,295,229 B2 | 11/2007 | Kumata et al. |
| 7,511,734 B2 | 3/2009 | Ozaki |
| 7,592,928 B2 | 9/2009 | Chinomi et al. |
| 7,728,879 B2 | 6/2010 | Ishii |
| 7,734,417 B2 | 6/2010 | Chinomi et al. |
| 2002/0071650 A1 * | 6/2002 | Kaneko .................. 386/46 |
| 2007/0085901 A1 | 4/2007 | Yang et al. |
| 2007/0285549 A1 | 12/2007 | Takano |
| 2008/0143835 A1 | 6/2008 | Abe et al. |

* cited by examiner

IMAGE-PROCESSING SYSTEM AND IMAGE-PROCESSING METHOD

RELATED APPLICATIONS

The present application is a divisional application of U.S. patent application Ser. No. 12/244,344 (still pending), filed Oct. 2, 2008 now U.S. Pat. No. 8,155,385, which claims priority to Japanese Patent Application Serial Number 2007-267886, filed Oct. 15, 2007, the entirety of each of which are hereby incorporated by reference.

FIELD OF THE INVENTION

The present invention relates to an image-processing system and an image-processing method that process image data obtained by capturing images outside a periphery of a vehicle.

BACKGROUND OF THE INVENTION

In recent years, systems have been proposed to increase the safety of a vehicle by providing a driver the ability to monitor a periphery of a vehicle by capturing images outside a vehicle periphery and displaying the captured images. For example, a vehicle-periphery-monitoring apparatus disclosed in Japanese Unexamined Patent Application Publication No. 2003-169323 obtains at least two bird's-eye-view images by determining a viewpoint above the vehicle by using at least two cameras to capture images outside the vehicle periphery, combining the bird's-eye-view images into a single image, adding a mask pattern to a portion where the bird's-eye-view images are joined to each other, as a border image, and displaying the single image. FIG. 11 shows an example image displayed by a known vehicle-periphery-monitoring system. As shown in FIG. 11, the displayed image may include a bird's-eye-view image 201 of a vehicle illustrated in the center of the displayed image, a bird's-eye-view image 212 showing an area ahead of the vehicle, a bird's-eye-view image 214 showing an area to the right of the vehicle, a bird's-eye-view image 216 showing an area in the rear of the vehicle, and a bird's-eye-view image 218 showing an area to the left of the vehicle, all of which are combined with one another. Further, a mask pattern 252 is added to a portion where the bird's-eye-view images 212 and 214 are joined to each other, a mask pattern 254 is added to a portion where the bird's-eye-view images 214 and 216 are joined to each other, a mask pattern 256 is added to a portion where the bird's-eye-view images 216 and 218 are joined to each other, and a mask pattern 258 is added to a portion where the bird's-eye-view images 218 and 212 are joined to each other.

Further, the vehicle-periphery-monitoring apparatus disclosed in Japanese Unexamined Patent Application Publication No. 2003-169323 is provided with an ultrasonic sensor configured to detect an object (obstacle) existing in blind spots of the displayed image such as the real space corresponding to the portion where the bird's-eye-view images are joined to each other. When the ultrasonic sensor detects the obstacle, the mask pattern added to the corresponding joining portion flashes. For example, in FIG. 11, if an object exists in the real space corresponding to the portion where the bird's-eye-view image 216 showing the rear area and the bird's-eye-view image 218 showing the left area are joined to each other, the mask pattern 256 flashes. The driver can confirm, for example, an obstacle existing in the periphery of the vehicle by viewing the image shown in FIG. 11.

However, even though the vehicle-periphery-monitoring apparatus disclosed in Japanese Unexamined Patent Application Publication No. 2003-169323 allows the driver to identify the existence of an object through the flashing mask pattern added to the joining portion, it is difficult for the driver to identify the shape and the specific position of the object. Further, if the posture of the vehicle is changed, namely, if the vehicle is inclined toward the front due to a person in the front seat of the vehicle, the range of the camera affixed to the vehicle is changed. Further, if end portions of real spaces 232 and 234 corresponding to two adjacent bird's-eye images are separated from each other so that a blind spot occurs and an object 202 exists in the blind spot, as shown in FIG. 12, it is difficult for the driver to identify the object 202. Therefore, the driver is not necessarily capable of adequately monitoring the vehicle periphery.

SUMMARY OF THE INVENTION

Accordingly, it is an object of the present invention to provide an image-processing system and an image-processing method that can monitor the periphery of a vehicle with increased reliability.

According to one aspect, there is provided an image-processing system processing image data obtained by capturing a plurality of images outside a periphery of a vehicle, where the image-processing system includes a plurality of image-capturing units that is affixed to the vehicle and that generates image-data items by capturing images outside the periphery of the vehicle, a bird's-eye-view-image-drawing unit configured to generate a bird's-eye-view image by determining a viewpoint above the vehicle for each of the image-data items generated by the image-capturing units based on the image-data item so that end portions of real spaces corresponding to two adjacent bird's-eye-view images overlap each other, an image-composition unit configured to generate a bird's-eye-view-composite image by combining the bird's-eye-view images with one another according to a predetermined layout, an object-detection unit configured to detect at least one object existing in at least one real space corresponding to at least one portion where the bird's-eye-view images included in the bird's-eye-view-composite image are joined to each other, a border-width-setting unit configured to determine one of overlap portions of the bird's-eye-view images included in the bird's-eye-view-composite image, the overlap portions being included in the joining portion, to be a border image and change a width of the border image when the object-detection unit detects at least one object existing in a real space corresponding to the overlap portion, and an image-addition unit configured to generate a border-and-bird's-eye-view-composite image in the joining portion by superimposing a border image having a width set by the border-width-setting unit on the overlap portion of one of the bird's-eye-view images.

According to the above-described configuration, the bird's-eye-view images are generated and combined with each other so that the end portions of the real spaces corresponding to the two adjacent bird's-eye-view images overlap each other, and the overlap portion of one of the bird's-eye-view images is determined to be the border image. Further, when the object exists in the real space corresponding to the joining portion, the width of the border image is changed so that the image corresponding to the object can be displayed. Consequently, a driver can identify what shape the object has and in which position the object exists.

According to another aspect, there is provided an image-processing system processing image data obtained by capturing images outside a periphery of a vehicle, where the image-processing system includes a plurality of image-capturing units that is affixed to the vehicle and that generates image-data items by capturing images outside the periphery of the vehicle, a bird's-eye-image-drawing unit configured to generate a bird's-eye-view image by determining a viewpoint above the vehicle for each of the image-data items generated by the image-capturing units based on the image-data item so that end portions of real spaces corresponding to two adjacent bird's-eye-view images overlap each other, an image-composition unit configured to generate a bird's-eye-view-composite image by combining the bird's-eye-view images with one another according to a predetermined layout, a posture-change-detection unit configured to detect an amount of change in the posture of the vehicle, a border-width-setting unit configured to determine one of overlap portions included in a portion where the bird's-eye-view images included in the bird's-eye-view-composite image are joined to each other to be a border image and change a width of the border image based on the detected vehicle-posture-change amount, and an image-addition unit configured to generate a border-and-bird's-eye-view-composite image in the joining portion by superimposing a border image having a width set by the border-width-setting unit on the overlap portion of one of the bird's-eye-view images.

According to the above-described configuration, the bird's-eye-view images are generated and combined with each other so that the end portions of the real spaces corresponding to the two adjacent bird's-eye-view images overlap each other, and the overlap portion of one of the bird's-eye-view images is determined to be the border image. Further, when the range of the image-capturing unit is changed due to the change in the posture of the vehicle, the range corresponding to the bird's-eye-view image, and when an object exists in the real space corresponding to the joining portion, the image corresponding to the object can be displayed by changing the width of the border image based on the vehicle-posture-change amount. Consequently, the driver can identify what shape the object has and in which position the object exists.

Further, in the above-described image-processing system, the border-width-setting unit may set the width of the border image to a value smaller than an initial value when the object-detection unit detects the object existing in the real space corresponding to the joining portion.

According to the above-described configuration, if an object exists in the real space corresponding to the joining portion, the width of the border image corresponding to the joining portion is set to the value smaller than the initial value (equivalent to the width of the overlap portion) so that the image corresponding to the object can be displayed in the joining portion. Consequently, the driver can identify what shape the object has and in which position the object exists.

Further, in the above-described image-processing system, the object-detection unit may include a sensor that is provided for each of the at least one real space corresponding to the at least one joining portion that detects at least one object existing in the real space.

Further, in the above-described image-processing system, when generating the overlap portions of the bird's-eye-view images, the image-composition unit may determine a bird's-eye-view image corresponding to the image-data item generated by the image-capturing unit having a narrow view angle of the image-capturing units generating the image-data items corresponding to the bird's-eye-view images to be the other bird's-eye-view image, and may generate the overlap portion of the other bird's-eye-view image with priority.

According to the above-described configuration, an image generated based on the image-data item generated by the image-capturing unit having the narrow view angle becomes a bird's-eye-view image with a small amount of distortion. Therefore, the bird's-eye-view image with the small amount of distortion is displayed with priority so that an image with high quality can be provided.

Further, the above-described image-processing system may further include a frame memory configured to store image data corresponding to an image for display, and the image-composition unit may store image data corresponding to each of the bird's-eye-view images drawn by the image-drawing unit in a predetermined storage area determined for each of the bird's-eye-view images, the predetermined storage area being provided in the frame memory, and the image-addition unit may store image data corresponding to the border image in a predetermined storage area determined for each of the border images, the predetermined storage area being provided in the frame memory.

Further, the above-described image-processing system may further include a mapping memory configured to store data on a mapping table showing an association between a position of each of pixels of the bird's-eye-view image generated by the image-drawing unit and a storage area provided in the frame memory, and the image-composition unit may store image data on each of pixels corresponding to the bird's-eye-view image drawn by the image-drawing unit in a predetermined storage area provided in the frame memory based on the mapping table.

Further, the above-described image-processing system may further include an image-display unit configured to display an image generated based on the image data stored in the frame memory.

Further, in the above-described image-processing system, the plurality of image-capturing units may include a first image-capturing unit that captures an image of an area ahead of the vehicle, a second image-capturing unit that captures an image of an area on the right of the vehicle, a third image-capturing unit that captures an image of an area in the rear of the vehicle, and a fourth image-capturing unit that captures an image of an area on the left of the vehicle.

According to another aspect, there is provided an image-processing method provided to process image data obtained by capturing images outside a periphery of a vehicle, where the image-processing method includes the steps of capturing images outside the periphery of the vehicle using a plurality of image-capturing units affixed to the vehicle and generating image-data items, generating a bird's-eye-view image by determining a viewpoint above the vehicle for each of the image-data items generated at the image-capturing step based on the image-data item so that end portions of real spaces corresponding to two adjacent bird's-eye-view images overlap each other, generating a bird's-eye-view-composite image by combining the bird's-eye-view images with one another according to a predetermined layout, detecting at least one object existing in at least one real space corresponding to at least one portion where the bird's-eye-view images included in the bird's-eye-view-composite image are joined to each other, determining one of overlap portions of the bird's-eye-view images included in the bird's-eye-view-composite image, the overlap portions being included in the joining portion, to be a border image and changing a width of the border image when at least one object existing in a real space corresponding to the overlap portion is detected at the object-detection step, and generating a border-and-bird's-eye-view-composite image in the joining portion by superimposing a border image having a width set at the border-width-setting step on the overlap portion of one of the bird's-eye-view images.

According to another aspect, there is provided an image-processing method provided to process image data obtained by capturing images outside a periphery of a vehicle, where the image-processing method includes the steps of capturing images outside the periphery of the vehicle using a plurality of image-capturing units affixed to the vehicle and generating image-data items, generating a bird's-eye-view image by determining a viewpoint above the vehicle for each of the image-data items generated at the image-capturing step based on the image-data item so that end portions of real spaces corresponding to two adjacent bird's-eye-view images overlap each other, generating a bird's-eye-view-composite image by combining the bird's-eye-view images with one another according to a predetermined layout, detecting an amount of change in the posture of the vehicle, determining one of overlap portions included in a portion where the bird's-eye-view images included in the bird's-eye-view-composite image are joined to each other to be a border image and changing a width of the border image based on the detected vehicle-posture-change amount; and drawing a border-and-bird's-eye-view-composite image in the joining portion by superimposing a border image having a width set at the border-width-setting step on the overlap portion of one of the bird's-eye-view images.

When an object existing in the real space corresponding to the portion where the bird's-eye-view images are joined to each other, the above-described systems and methods provides for displaying the image corresponding to the object and monitoring the vehicle periphery with increased reliability.

DESCRIPTION OF THE PREFERRED EMBODIMENTS

Figure 1:
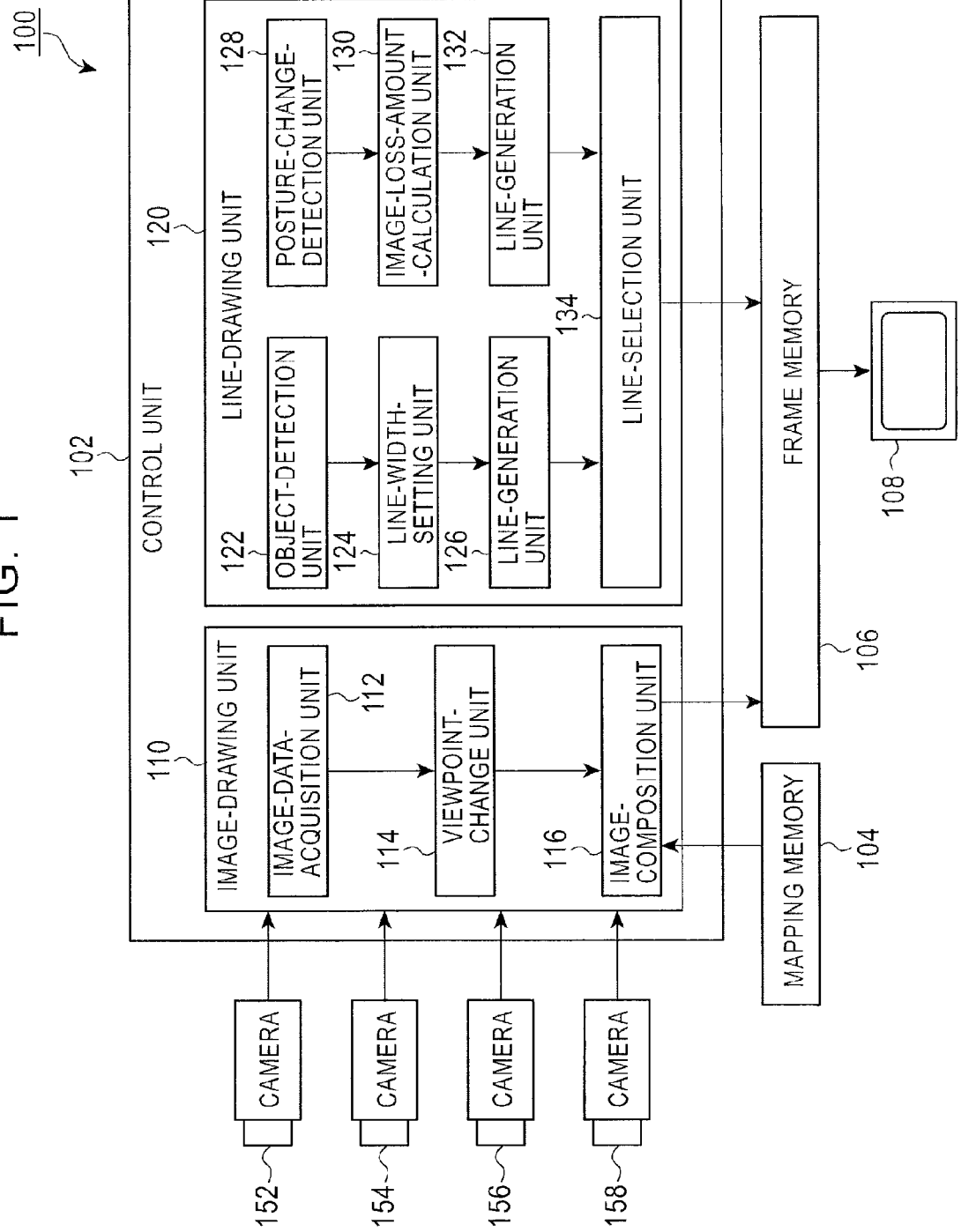
FIG. 1 illustrates one embodiment of a configuration of a vehicle-periphery-image-providing system.

FIG. 1 is a diagram illustrating one embodiment of a configuration of a vehicle-peripheral-image-providing system 100 using an image-processing system. The vehicle-peripheral-image-providing system 100 shown in FIG. 1, which is mounted on a vehicle, includes image-capturing units such as cameras 152, 154, 156, and 158, a control unit 102, a mapping memory 104, a frame memory 106, and a display 108. Of the above-described units, the control unit 102 includes an image-drawing unit 110 and a line-drawing unit 120. Further, the image-drawing unit 110 includes an image-data-acquisition unit 112, a viewpoint-change unit 114, and an image-composition unit 116. The line-drawing unit 120 includes an object-detection unit 122, a line-width-setting unit 124, a line-generation unit 126, a posture-change-detection unit 128, an image-loss-amount-calculation unit 130, a line-generation unit 132, and a line-selection unit 134.

Figure 2:
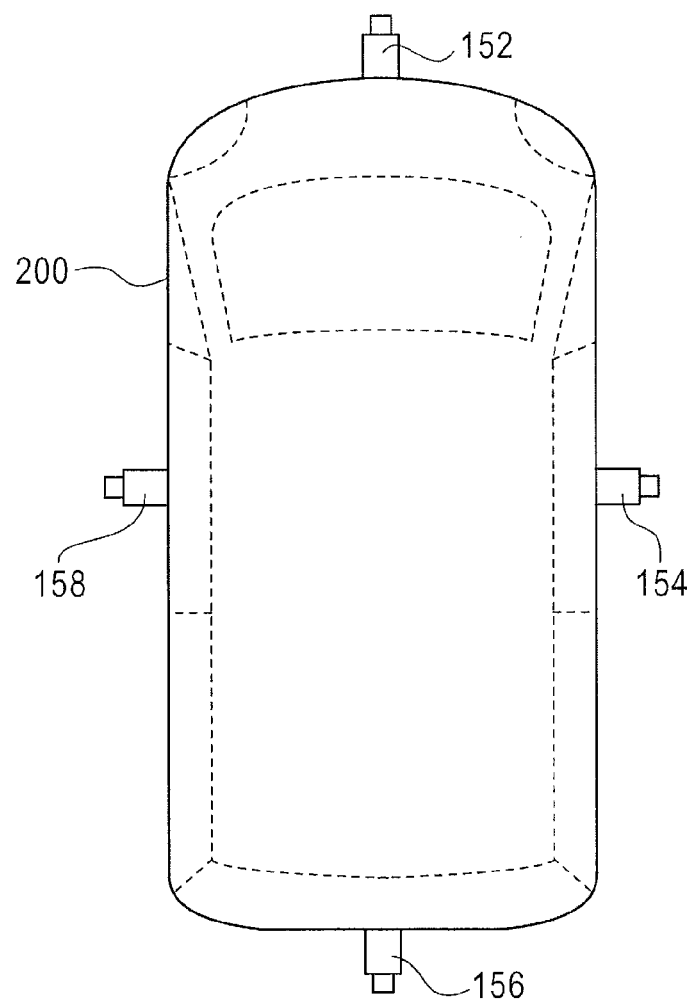
FIG. 2 illustrates one example in which cameras are affixed to a vehicle.

Each of the cameras 152 to 158 is affixed to the exterior of the vehicle, and captures an image outside a vehicle periphery and generates image data. FIG. 2 shows the position of each of the cameras 152 to 158 affixed to a vehicle 200. In FIG. 2, camera 152 is affixed to a center of a front part of the vehicle 200 and captures an image of an area in front of the vehicle 200. Camera 154 is affixed to a right side of the vehicle 200 and captures an image of an area on the right of the vehicle 200. Camera 156 is affixed to a center of a rear part of the vehicle 200 and captures an image of an area in the rear of the vehicle. Camera 158 is affixed to a left side of the vehicle 200 and captures an image of an area on the left of the vehicle 200. Each of the cameras 152 to 158 includes a wide-angle lens and/or a fish-eye lens (not shown) and has a wide angle of view so that cameras 152 to 158 may capture the perimeter of the vehicle 200.

Returning to FIG. 1, the control unit 102 controls the entire vehicle-peripheral-image-providing system 100. More specifically, in the image-data-drawing unit 110 provided in the control unit 102, the image-data-acquisition unit 112 acquires four image-data items captured by each of the cameras 152 to 158. The viewpoint-change unit 114 changes the viewpoint according to a known method for each of the four image-data items acquired by the image-data-acquisition unit 112 based on each of the four image-data items, and generates data on bird's-eye-view images generated by determining a viewpoint above the vehicle 200. In that case, the viewpoint-change unit 114 generates the bird's-eye-view images so that end portions of the real spaces corresponding to two adjacent bird's-eye-view images overlap each other. For example, the width of an overlap portion of each of the end portions of the real spaces corresponding to the two adjacent bird's-eye-view images should be equivalent to 300 mm or more. The bird's-eye-view-image data includes image data on each pixel, where the image data indicates the lightness, the saturation, and the hue of each pixel.

The image-composition unit 116 cuts a portion from data on each of four bird's-eye-view images based on a mapping table on which data is stored in the mapping memory 104, and stores data on the cut portions in the frame memory 106. Here, for each bird's-eye-view image, the mapping table associates the position of each of pixels included in the bird's-eye-view image with a storage area provided in the frame memory 106. By referring to the mapping table, the image-composition unit 116 specifies a storage area in which the image data on each pixel, the image data being included in the image data on each of the four bird's-eye-view images, should be stored, the storage area being provided in the frame memory 106. Then, the image-composition unit 116 stores the image data on each pixel in the specified storage area, the pixel corresponding to the specified storage area.

By storing the image data in the frame memory 106 in the above-described manner, the four bird's-eye-view images are combined with one another and a single bird's-eye-view image (hereinafter referred to as a bird's-eye-view-composite image) is generated. As described above, since the viewpoint-change unit 114 draws the bird's-eye-view images so that the end portions of the real spaces corresponding to the two adjacent bird's-eye-view images overlap each other, end portions of two adjacent bird's-eye-view images of the bird's-eye-view images included in the bird's-eye-view-composite image partly overlap each other. Each of the overlap portions is achieved by associating the position of each of pixels generating the end portion of each of the two bird's-eye-view images with a single storage area provided in the frame memory 106 on a one-to-one basis on the mapping table.

Figure 3:
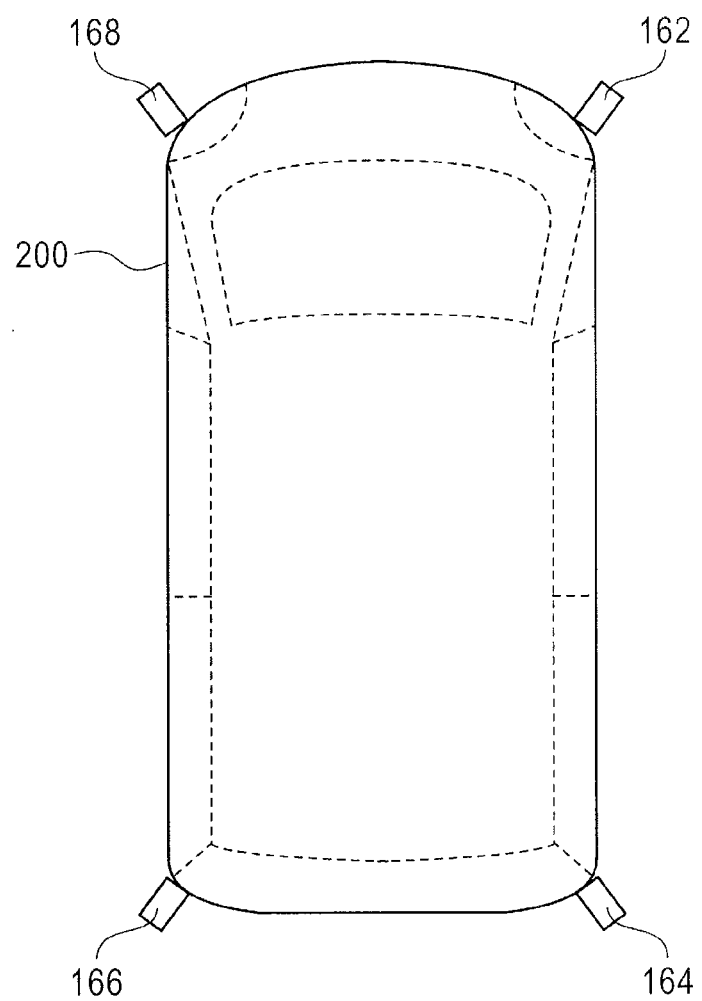
FIG. 3 illustrates one example in which ultrasonic sensors are affixed to the vehicle.

In the line-drawing unit 120 provided in the control unit 102, the object-detection unit 122 includes at least two ultrasonic sensors. FIG. 3 shows the positions of the ultrasonic sensors affixed to the vehicle 200. In FIG. 3, each of four ultrasonic sensors 162, 164, 166, and 168 determines the real space corresponding to a portion where the above-described two adjacent bird's-eye-view images are joined to each other to be a detection range, and detects an object existing in the detection range. In the above-described embodiment, there are four portions where two adjacent bird's-eye-view images are joined to each other. Therefore, each of the four ultrasonic sensors 162 to 168 determines the real space corresponding to one of the four joining portions to be the detection range.

When the above-described object-detection unit 122 detects an object in the real space corresponding to the portion where two bird's-eye-view images are joined to each other, the line-width-setting unit 124 determines the width of an image of the border (hereinafter referred to as a "line") corresponding to the joining portion. The line-generation unit 126 generates the image data corresponding to the image of a line having the width determined by the above-described line-width-setting unit 124.

The posture-change-detection unit 128 detects the amount of change in the posture of the vehicle 200, the change being heretofore observed from the initial state. More specifically, the posture of the vehicle 200 in which no passenger exists is determined to be the initial state. In that case, the vehicle 200 is inclined toward the front if there is a person in the front seat of the vehicle 200, and the vehicle 200 is inclined toward the rear if there is a person in the rear seat of the vehicle 200 so that the posture changes from the initial state. The posture-change-detection unit 128 digitizes the change in the posture of the vehicle 200 from the initial state, and detects and externally transmits data on the digitized change, as data on a posture-change amount.

The image-loss-amount-calculation unit 130 calculates the width of an overlap portion of each of the real spaces corresponding to the two adjacent bird's-eye-view images based on the posture-change amount calculated by the above-described posture-change-amount-calculation unit 128. When the posture of the vehicle 200 is changed, the range of each of the cameras 152 to 158 and the width of the overlap portion of each of the real spaces corresponding to the two adjacent bird's-eye-view images are changed. The image-loss-amount-calculation unit 130 can calculate the width of the overlap portion of each of the real spaces corresponding to the two adjacent bird's-eye-view images based on the association between the change in the posture of the vehicle 200 and a change in the width of the overlap portion of each of the real spaces corresponding to the two adjacent bird's-eye-view images.

The line-generation unit 132 determines the width of a line image based on the width of the overlap portion of each of the real spaces corresponding to the two adjacent bird's-eye-view images, the width being calculated by the above-described image-loss-amount-calculation unit 130, and generates the image data corresponding to the line image having the determined width.

The line-selection unit 134 selects either the image data corresponding to the line image generated by the above-described line-generation unit 126 or the image data corresponding to the line image generated by the above-described line-generation unit 132, and stores the selected image data in a predetermined storage area provided in the frame memory 106, the storage area corresponding to the selected image data. Here, the storage area in which the image data corresponding to the line image should be stored, the storage area being provided in the frame memory 106, corresponds to the portion where two bird's-eye-view images generating the above-described bird's-eye-view-composite image are joined to each other.

By storing the above-described image data in the frame memory 106, the line image is superimposed on one of overlap portions generating the portion where the two adjacent bird's-eye-view images included in the bird's-eye-view-composite image are joined to each other so that a line-and-bird's-eye-view-composite image is drawn. The monitor 108 reads and displays the image data stored in the frame memory.

In the vehicle-periphery-image-providing system 100 shown in FIG. 1, camera 152 corresponds to the first image-capturing unit, camera 154 corresponds to the second image-capturing unit, camera 156 corresponds to the third image-capturing unit, and camera 158 corresponds to the fourth image-capturing unit, the viewpoint-change unit 114 corresponds to a bird's-eye-view-image-drawing unit, and the image-composition unit 116 corresponds to an image-composition unit. Further, the object-detection unit 122 corresponds to an object-detection unit, the line-width-setting unit 124 and the image-loss-amount-calculation unit 130 correspond to a border-width-setting unit, the line-generation unit 126, the line-generation unit 132, and the line-selection unit 134 correspond to an image-addition unit, and the posture-change-detection unit 128 corresponds to a posture-change-detection unit. Further, the monitor 108 corresponds to an image-display unit.

Figure 4:
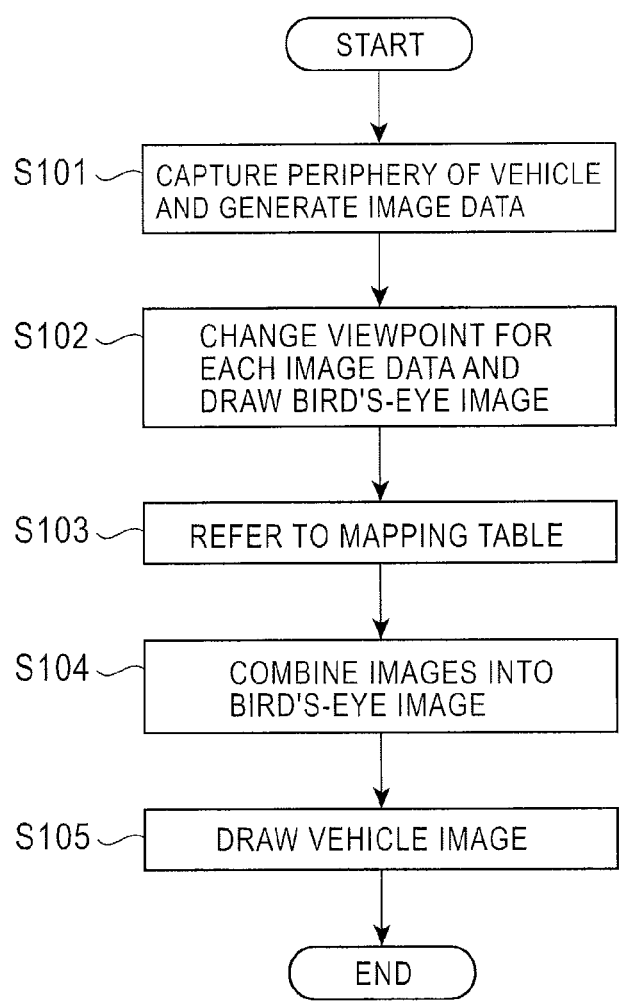
FIG. 4 is a flowchart of a method for generating a bird's-eye-view composite image that may be generated by a vehicle-periphery-image-providing system.

Next, operations of the vehicle-periphery-image-providing system 100 will be described with reference to a flowchart of FIG. 4. The flowchart of FIG. 4 shows the operations to generate a bird's-eye-view-composite image that may be generated by the vehicle-periphery-image-providing system 100.

Each of the cameras 152 to 158 captures an image of a periphery of the vehicle 200 and generates image data, at step S101. Further, each of the cameras 152 to 158 adds identification information of its own (hereinafter referred to as "camera-identification information") to the generated image data and transmits the image data to the image-data-acquisition unit 112 provided in the image-drawing unit 110 of the control unit 102. The image-data-acquisition unit 112 acquires four image-data items generated by the above-described cameras 152 to 158, that is, the image-data items corresponding to the area ahead of the vehicle 200, the area on the right of the vehicle 200, the area in the rear of the vehicle 200, and the area on the left of the vehicle 200. Then, the image-data-acquisition unit 112 transmits the acquired image-data items to the viewpoint-change unit 114.

The viewpoint-change unit 114 changes the viewpoint for each of the four transmitted image-data items according to a known method based on the image-data items, and generates data on bird's-eye-view images based on a viewpoint above the vehicle 200. Consequently, at step S102, the above-described bird's-eye-view images are generated so that end portions of the real spaces corresponding to two adjacent bird's-eye-view images overlap each other. The viewpoint-change unit 114 adds the camera-identification information to data on the four generated bird's-eye-view images, that is, data on the bird's-eye-view images corresponding to the areas ahead, on the right, in the rear, and on the left of the vehicle 200, where the camera-identification information had been added to image data which is the origin of the data on the four generated bird's-eye-view images. Then, the viewpoint-change unit 114 transmits the data on the four generated bird's-eye-view images to the image-composition unit 116.

Upon receiving the data on the four bird's-eye-view images, the image-composition unit 116 determines to which of the areas ahead, on the right, in the rear, and on the left of the vehicle 200 the image data corresponds to based on the camera-identification information added to the image data. Further, by referring to the mapping table on which data is stored in the mapping memory 104, the image-composition unit 116 specifies a storage area in which image data on each pixel, the image data being included in data on each of the bird's-eye-view images corresponding to the areas ahead, on the right, in the rear, and on the left of the vehicle 200, should be stored, the storage area being provided in the frame memory 106. Then, the image-composition unit 116 stores the image data on each pixel in the specified storage area. Consequently, at step S104, the bird's-eye-view images corresponding to the areas ahead, on the right, in the rear, and on the left of the vehicle 200 are combined so that a single bird's-eye-view-composite image is generated.

Figure 5:
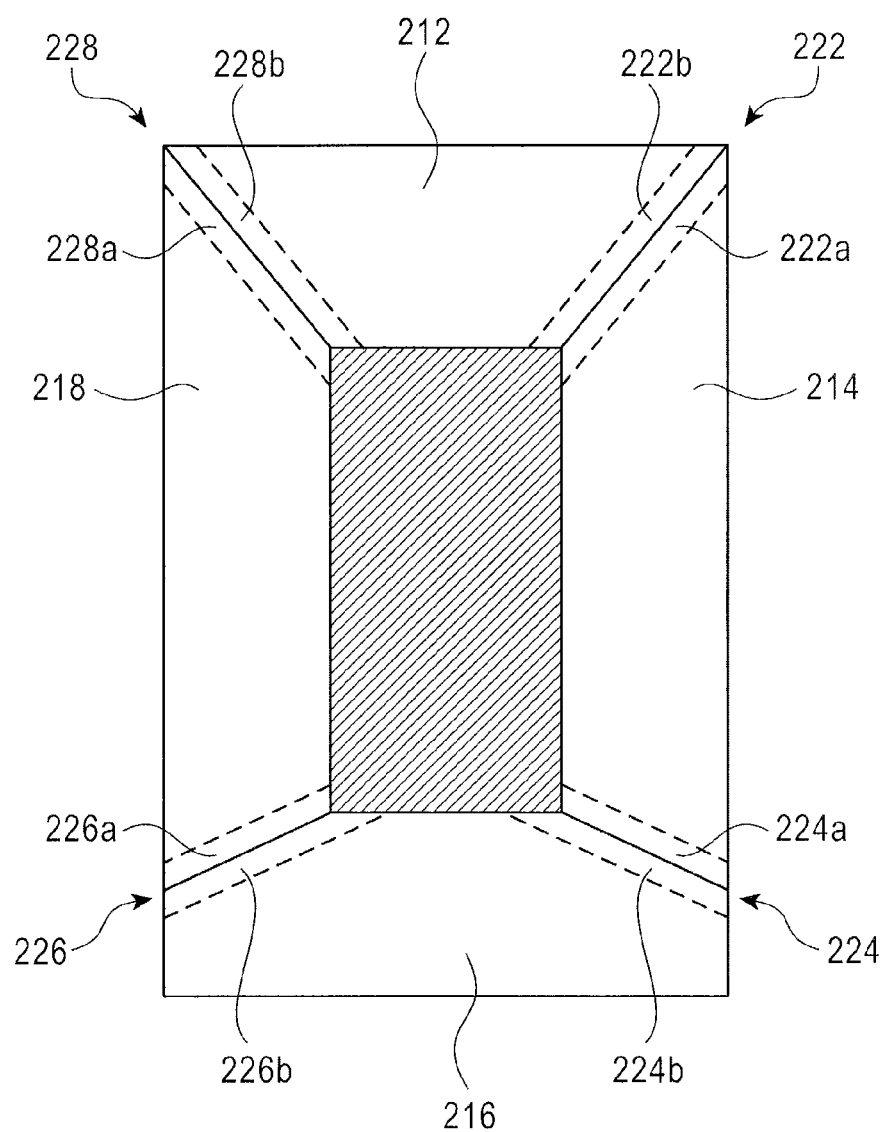
FIG. 5 shows an example of a bird's-eye-view-composite image.
Figure 6A:
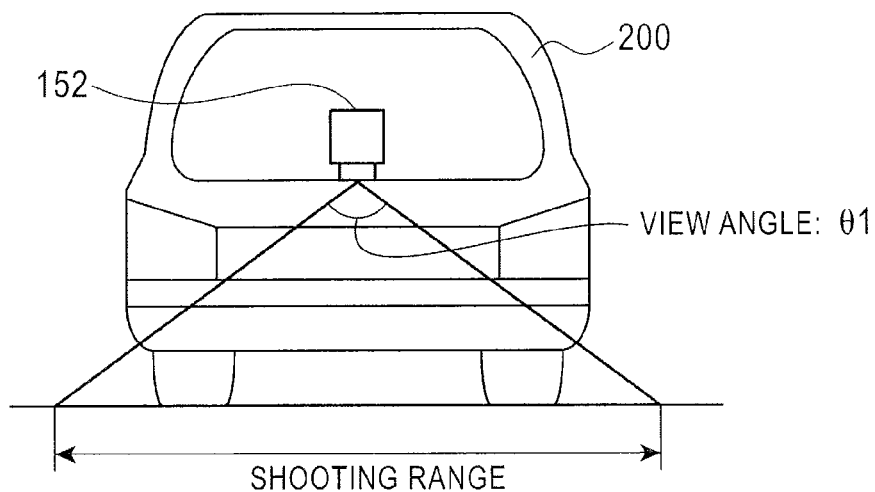
FIG. 6A shows an example of a view angle of a camera.
Figure 6B:
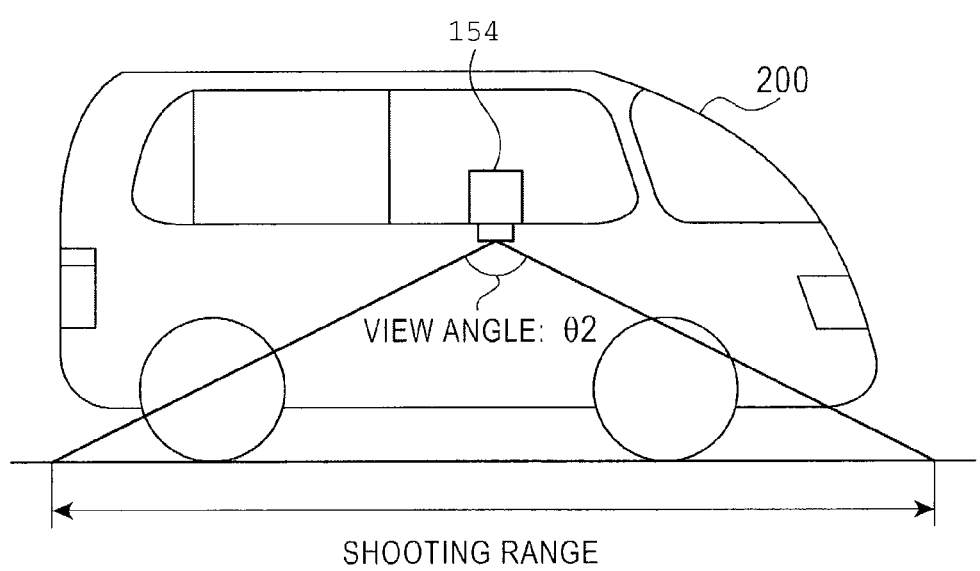
FIG. 6B shows another example of a view angle of a camera.

FIG. 5 shows an example of the bird's-eye-view-composite image. The bird's-eye-view-composite image shown in FIG. 5 is obtained by combining a bird's-eye-view image 212 corresponding to the area ahead of the vehicle 200, a bird's-eye-view image 214 corresponding to the area on the right of the vehicle 200, a bird's-eye-view image 216 corresponding to the area in the rear of the vehicle 200, and a bird's-eye-view image 218 corresponding to the area on the left of the vehicle 200 with one another. According to the bird's-eye-view-composite image, in a portion 222 where the bird's-eye-view image 212 corresponding to the ahead area and the bird's-eye-view image 214 corresponding to the right area are joined to each other, image data 222b corresponding to an end portion of the bird's-eye-view image 212 corresponding to the ahead area and image data 222a corresponding to an end portion of the bird's-eye-view image 214 corresponding to the right area are stored in a predetermined storage area provided in the frame memory 106, and the image data 222a is replaced with data on a line image that will be described later. Consequently, the bird's-eye-view image 212 corresponding to the area ahead of the vehicle 200 is displayed with priority. The reason why the bird's-eye-view image 212 is displayed with priority will be described below. Namely, when a view angle θ1 of the camera 152 capturing an image of the area ahead of the vehicle 200 shown in FIG. 6A is compared to a view angle θ2 of the camera 154 capturing an image of the area on the right of the vehicle 200 shown in FIG. 6B, the view angle θ1 of the camera 152 is narrower than the view angle θ2 of the camera 154, since the range of the camera 152 is smaller than that of the camera 154. Therefore, the distortion of the bird's-eye-view image corresponding to image data generated by the camera 152 is less than that of the bird's-eye-view image corresponding to image data generated by the camera 154. Therefore, it is preferable that the bird's-eye-view image corresponding to the image data generated by the camera 152, that is, the bird's-eye-view image 212 corresponding to the area ahead of the vehicle 200 is displayed with priority.

Returning to FIG. 5, since the view angle of the camera 152 capturing an image of the area ahead of the vehicle 200 is narrower than that of the camera 158 capturing an image of the area on the left of the vehicle 200, as described above, in a portion 228 where the bird's-eye-view image 212 corresponding to the area ahead of the vehicle 200 and the bird's-eye-view image 218 corresponding to the area on the left of the vehicle 200 overlap each other, image data 228b corresponding to an end portion of the bird's-eye-view image 212 corresponding to the ahead area and image data 228a corresponding to an end portion of the bird's-eye-view image 218 corresponding to the left area are stored in a predetermined storage area provided in the frame memory 106, and the image data 228a is replaced with data on a line image that will be described later. Consequently, the bird's-eye-view image 212 corresponding to the area ahead of the vehicle 200 is displayed with priority.

Further, since the view angle of the camera 156 capturing an image of the area in the rear of the vehicle 200 is narrower than that of the camera 154 capturing an image of the area on the right of the vehicle 200, in a portion 224 where the bird's-eye-view image 216 corresponding to the area in the rear of the vehicle 200 and the bird's-eye-view image 214 corresponding to the area on the right of the vehicle 200 overlap each other, image data 224b corresponding to an end portion of the bird's-eye-view image 216 corresponding to the rear area and image data 224a corresponding to an end portion of the bird's-eye-view image 214 corresponding to the right area are stored in a predetermined storage area provided in the frame memory 106, and the image data 224a is replaced with data on a line image that will be described later. Consequently, the bird's-eye-view image 216 corresponding to the rear area is displayed with priority.

Further, since the view angle of the camera 156 capturing an image of the area in the rear of the vehicle 200 is narrower than that of the camera 158 capturing in image of the area on the left of the vehicle 200, in a portion 226 where the bird's-eye-view image 216 corresponding to the rear area and the bird's-eye-view image 218 corresponding to the left area overlap each other, image data 226b corresponding to an end portion of the bird's-eye-view image 216 corresponding to the rear area and image data 226a corresponding to an end portion of the bird's-eye-view image 218 corresponding to the left area are stored in a predetermined storage area provided in the frame memory 106, and the image data 226a is replaced with data on a line image that will be described later. Consequently, the bird's-eye-view image 216 corresponding to the rear area is displayed with priority.

Figure 7:
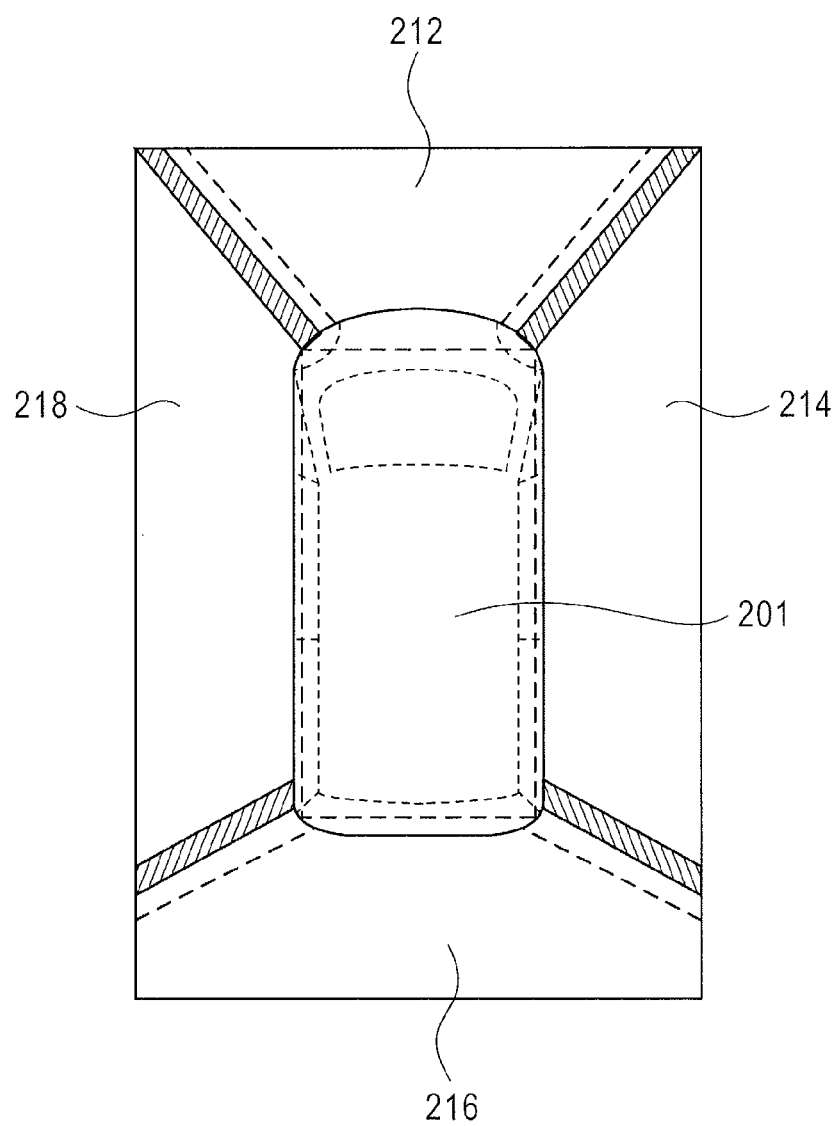
FIG. 7 shows another example of a bird's-eye-view-composite image and an example of a vehicle image.

Returning to FIG. 4, when the bird's-eye-view-composite image is generated, the image-composition unit 116 stores the image data corresponding to an image generated by determining a viewpoint above the vehicle 200 in the storage area corresponding to a portion surrounded by the bird's-eye-view-composite image, the storage area being provided in the frame memory 106. Subsequently, as shown in FIG. 7, a vehicle image 201 corresponding to the vehicle 200 is drawn in a portion surrounded by the bird's-eye-view image 212 corresponding to the area ahead of the vehicle 200, the bird's-eye-view image 214 corresponding to the right area, the bird's-eye-view image 216 corresponding to the rear area, the bird's-eye-view image 218 corresponding to the left area, and a bird's-eye-view-composite image including a border image in each of portions where the above-described bird's-eye-view images are joined to each other.

Figure 8:
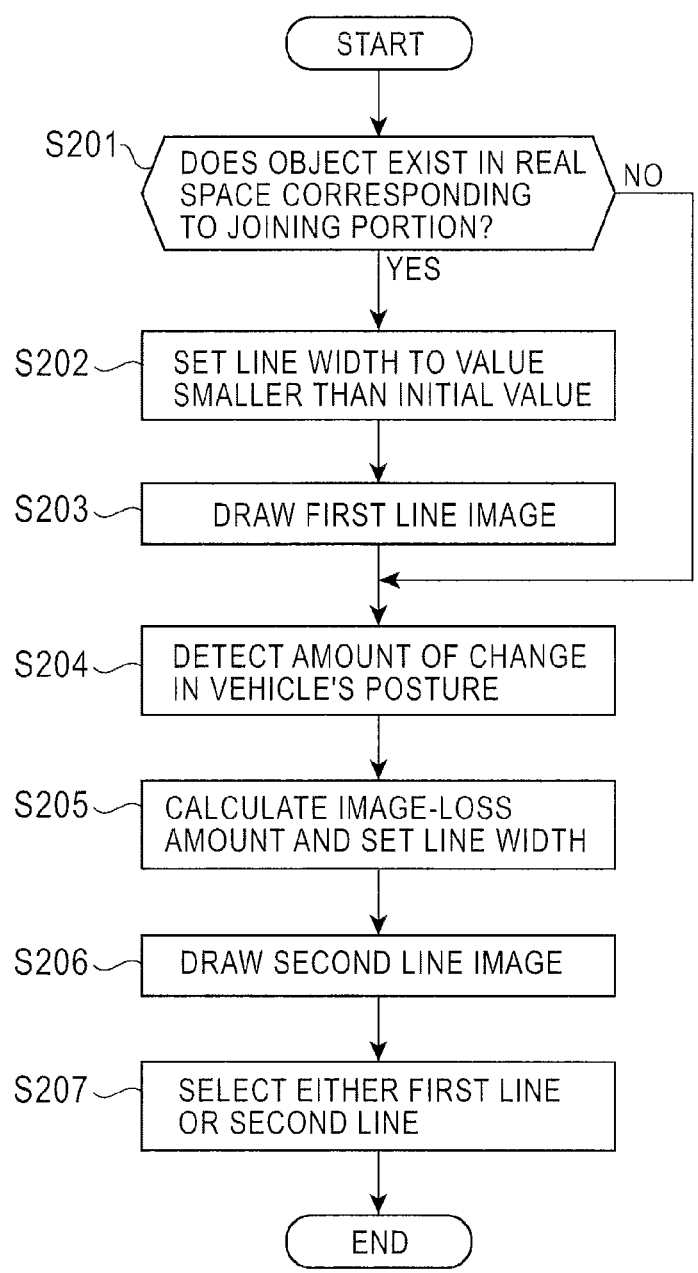
FIG. 8 is a flowchart of a method for generating a line image that may be generated by a vehicle-periphery-image-providing system.

After the bird's-eye-view-composite image and the vehicle image are drawn in the above-described manner, the line image is generated. FIG. 8 is a flowchart illustrating operations performed by the vehicle-periphery-image-providing system 100 to generate the line image.

In the line-drawing unit 120 provided in the control unit 102, the object-detection unit 122 detects an object existing in the real space corresponding to a portion where two adjacent bird's-eye-view images are joined to each other. Here, four ranges where the object-detection unit 122 performs the detection correspond to four joining portions included in the bird's-eye-view-composite image on a one-to-one basis, where two adjacent bird's-eye-view images are joined to each other in each of the four joining portions. For determining to which joining portion the detection result corresponds in the post stage, the object-detection unit 122 adds information used to identify the joining portion where two adjacent bird's-eye-view images are joined to each other to data on the detection result, and transmits the detection-result data to the line-width-setting unit 124. At step S201, the line-width-setting unit 122 determines whether or not an object exists in the real space corresponding to the joining portion where the two adjacent bird's-eye-view images are joined to each other based on the transmitted detection-result data.

If an object exists in the real space corresponding to the joining portion where the two adjacent bird's-eye-view images are joined to each other, at step S202 the line-width-setting unit 122 sets the width of the line image corresponding to the joining portion to a value smaller than the initial value. Here, the initial value of the line width is the value of the width of a portion where the two adjacent bird's-eye-view images overlap each other, for example. Further, when the line width is set to a value smaller than the initial value, the value of the line image may become zero.

Further, the line-width-setting unit 122 adds information about a storage area in which the image data corresponding to the line image should be stored, the storage area being provided in the frame memory 106, to data on the set line width, and transmits the line-width data to the line-generation unit 126. Here, the storage area in which the image data corresponding to the line image should be stored, the storage area being provided in the frame memory 106, corresponds to the joining portion where the two adjacent bird's-eye-view images are joined to each other on the one-to-one basis. Therefore, the line-width-setting unit 122 can specify the storage area in which the image data corresponding to the line image should be stored, the storage area being provided in the frame memory 106, based on the information used to identify the joining portion where the two adjacent bird's-eye-view images are joined to each other, the identification information added to the detection-result data.

At step S203, the line-generation unit 126 generates the first line image by generating the image data corresponding to the first line image based on the width of the line image on which data is transmitted thereto. The image data corresponding to the generated first line image is transmitted to the line-selection unit 134 with information about the storage area in which the image data corresponding to the first line image should be stored, the storage area being provided in the frame memory 106.

After the first line image is drawn at step S203 and/or after it is determined that no object exists in the real space corresponding to the joining portion where the two adjacent bird's-eye-view images are joined to each other at step S201, at step S204 the posture-change-detection unit 128 detects the amount of change in the posture of the vehicle 200, the change being heretofore observed from the initial state. Data on the detected posture-change amount is transmitted to the image-loss-amount-calculation unit 130.

The image-loss-amount-calculation unit 130 calculates the width of a portion where the real spaces corresponding to the two adjacent bird's-eye-view images overlap each other based on the transmitted posture-change-amount data, as the image-loss amount. For example, if the vehicle 200 is inclined toward the front, portions where the range of the camera 156 capturing an image of the area in the rear of the vehicle 200, and the ranges of the camera 154 capturing an image of the area on the right of the vehicle 200 and the camera 158 capturing an image of the area on the left of the vehicle 200 overlap one another decrease. The above-described decrease in the overlap portions means that each of the width of a portion where the real space corresponding to the bird's-eye-view image showing the area in the rear of the vehicle 200 and the real space corresponding to the bird's-eye-view image showing the area in the right of the vehicle 200 overlap each other, and that of a portion where the real space corresponding to the bird's-eye-view image showing the area in the rear of the vehicle 200 and the real space corresponding to the bird's-eye-view image showing the area on the left of the vehicle 200 overlap each other becomes narrower than that attained when the posture of the vehicle 200 is in the initial state.

Further, at step S205 the image-loss-amount-calculation unit 130 sets the width of the line image based on the calculated image-loss amount. More specifically, when the value of the calculated image-loss amount is equivalent to a predetermined value or more, the image-loss-amount-calculation unit 130 sets the width of the line image to the first predetermined value. On the other hand, when the value of the calculated image-loss amount is equivalent to a predetermined value or less, the image-loss-amount-calculation unit 130 makes the line-image width proportionate to the image-loss amount so that the line-image width is set to the first predetermined value or less. Consequently, it becomes possible to set the line-image width to the first predetermined value or less at all times.

Further, the image-loss-amount-calculation unit 130 adds information about a storage area in which the image data corresponding to the line image should be stored, the storage area being provided in the frame memory 106, to data on the set line-image width, and transmits the set-line-image-width data to the line-generation unit 126.

At step S206, the line-generation unit 126 generates the image data corresponding to the second line image based on the transmitted line-image-width data so that the second line image is generated. The image data corresponding to the generated second line image is transmitted to the line-selection unit 134 with information about a storage area in which the image data corresponding to the second line image should be stored, the storage area being provided in the frame memory 106.

Based on an operation instruction or the like issued by a user through an operation unit (not shown), the line-selection unit 134 selects either the image data corresponding to the first line image generated and transmitted by the line-generation unit 126 at step S203 or the image data corresponding to the second line image generated and transmitted by the line-generation unit 132 at step S206, and stores the selected image data in a storage area in which the image data should be stored, the storage area being provided in the frame memory 106, at step S207. Further, if at step S201 it is determined that no object exists in the real space corresponding to a portion where two adjacent bird's-eye-view images are joined to each other, the generation of the first line image at step S203 is not performed. In that case, the line-selection unit 134 stores the image data corresponding to the second line image generated and transmitted by the line-generation unit 132 at step S206 in a storage area in which the image data should be stored, the storage area being provided in the frame memory 106.

When the line images are drawn in addition to the bird's-eye-view-composite image and the vehicle image, the display 108 reads image data stored in the frame memory 106, the image data corresponding to the above-described bird's-eye-view-composite image, vehicle image, and line images, and displays the images.

Thus, the vehicle-periphery-image-providing system 100 according to the above-described embodiment draws and combines bird's-eye-view images generated by determining a viewpoint above the vehicle 200 into a bird's-eye-view-composite image so that end portions of the real spaces corresponding to two adjacent bird's-eye-view images overlap each other based on the image data corresponding to each of the areas ahead, on the right, in the rear, and on the left of the vehicle 200, the image data being obtained by capturing images outside a periphery of the vehicle. Further, the image of a border is added to each of joining portions where the bird's-eye-view images included in the bird's-eye-view-composite image are joined to each other. Further, when an object exists in the real space corresponding to the joining portion where the bird's-eye-view images are joined to each other, the vehicle-periphery-image-providing system 100 can display the image corresponding to the object by changing the width of the line image corresponding to the joining portion. When the shooting range corresponding to the bird's-eye-view image changes due to a change in the posture of the vehicle 200, the image corresponding to the object can be displayed by changing the width of the line image based on the amount of change in the posture of the vehicle 200.

Figure 9:
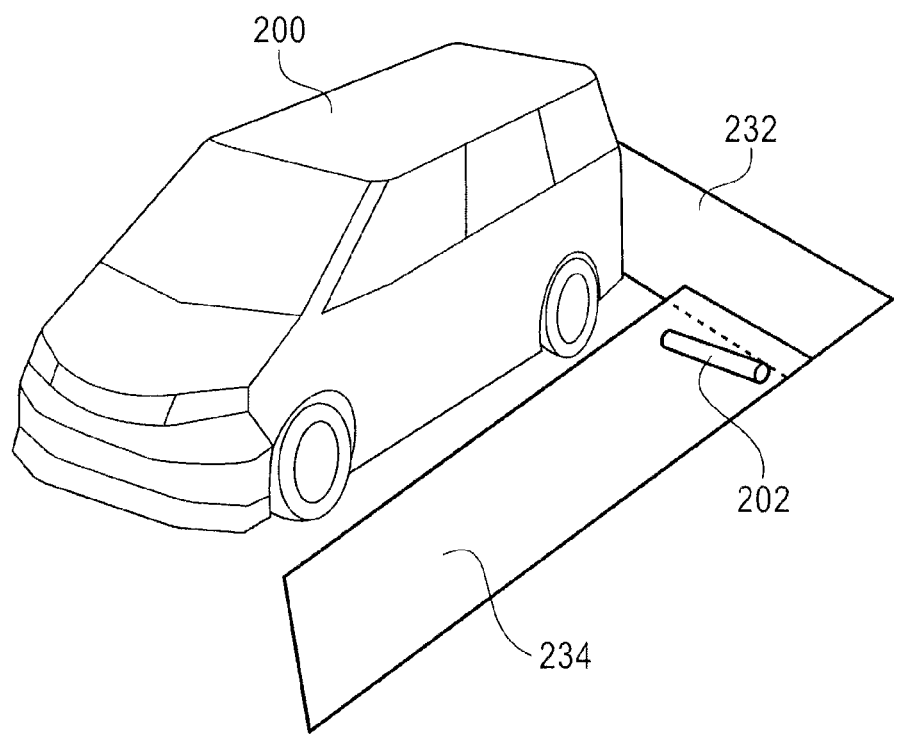
FIG. 9 shows an example of the real spaces corresponding to two adjacent bird's-eye-view images generated by a vehicle-periphery-image-providing system.
Figure 10:
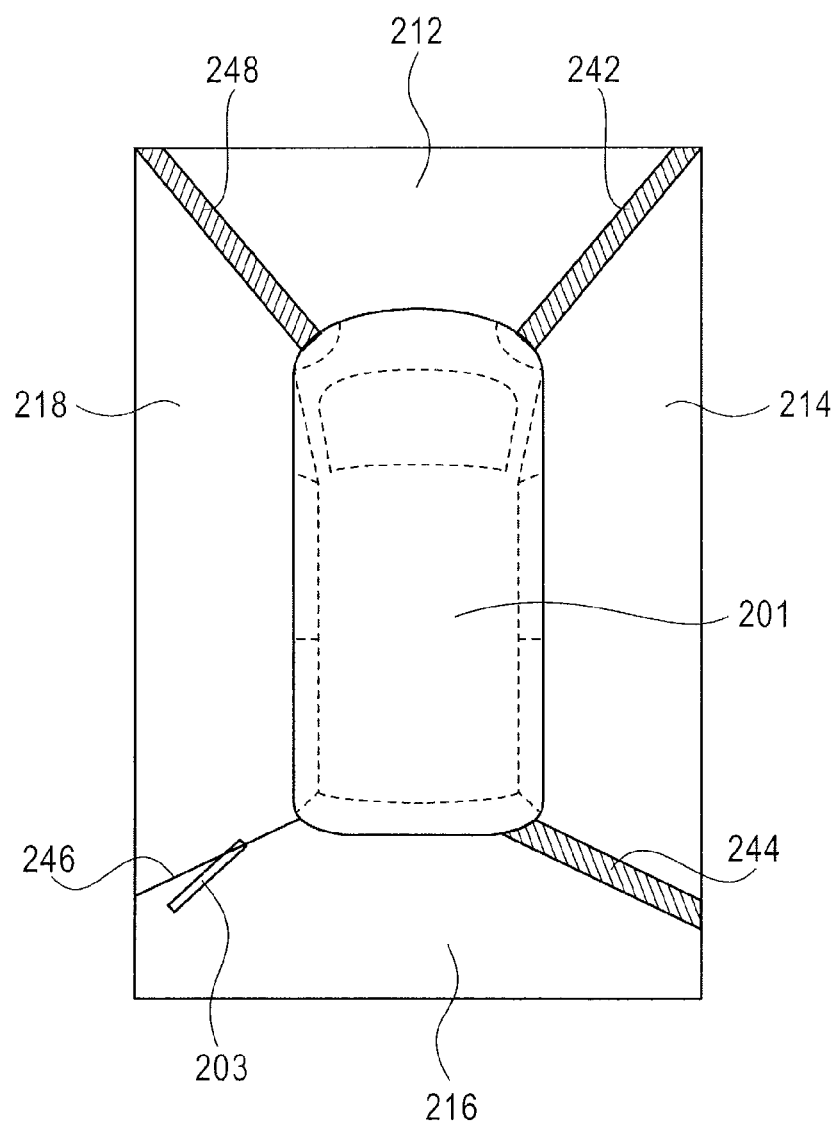
FIG. 10 shows another example of a bird's-eye-view-composite image, another example of a vehicle image, and an example of a line image.
Figure 11:
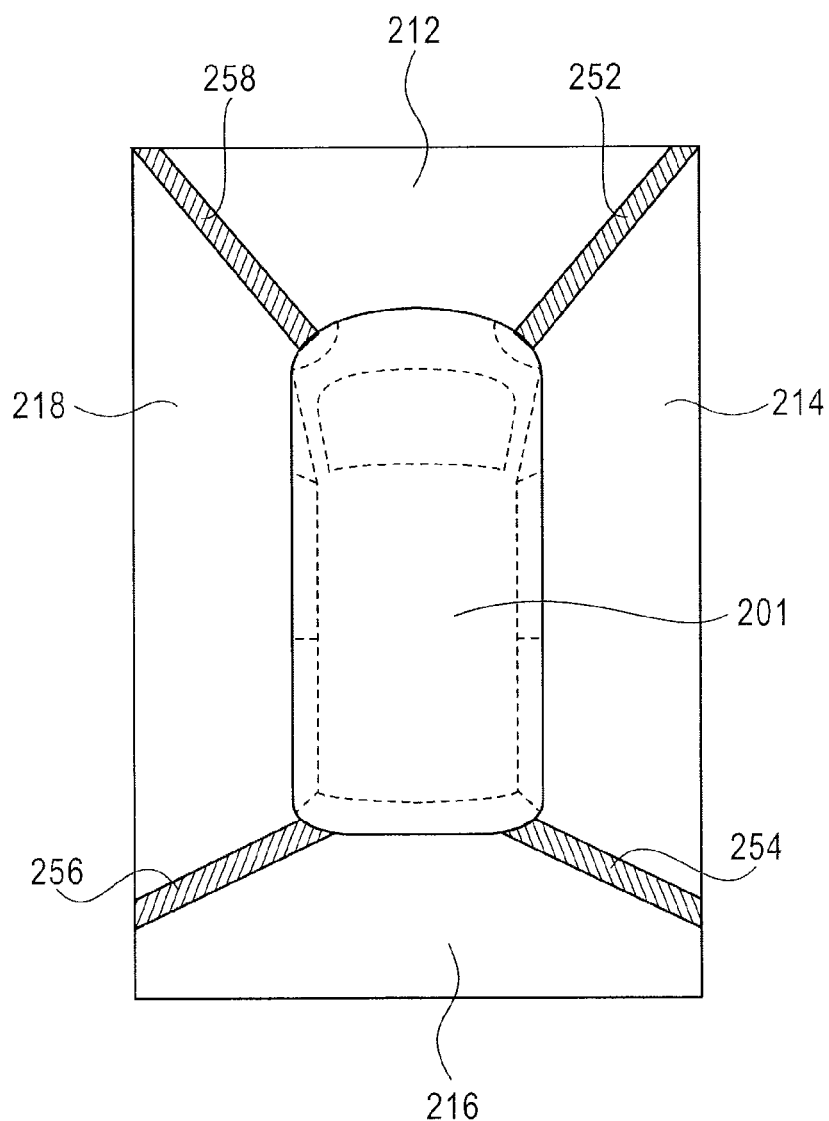
FIG. 11 shows an example of the real spaces corresponding to two adjacent bird's-eye-view images generated by a known vehicle-periphery-monitoring system.
Figure 12:
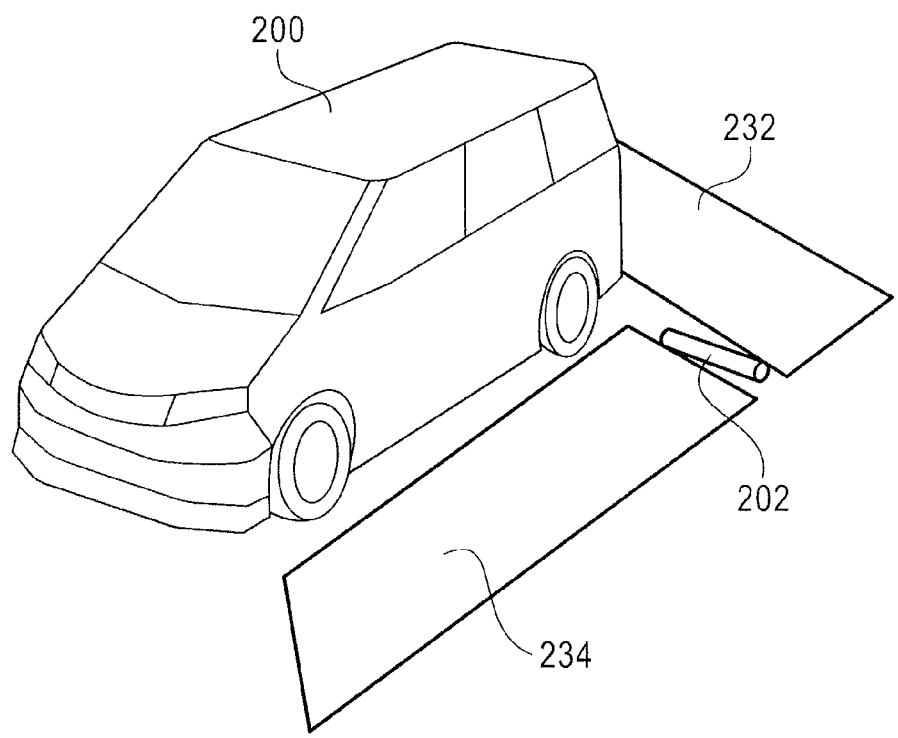
FIG. 12 shows an example of a bird's-eye-view-composite image, an example of a vehicle image, and an example of a mask-pattern image.

Accordingly, even though the range of each of the cameras 152 to 158 affixed to the vehicle 200 is changed due to a change in the posture of the vehicle 200, end portions of the real spaces 232 and 234 corresponding to two adjacent bird's-eye-view images are prevented from being separated and therefore no blind spot occurs, as shown in FIG. 9. Consequently, a driver can identify that an object 202 exists in the real space corresponding to a joining portion where the bird's-eye-view images are joined to each other and the shape of the object 202. Further, if an object exists in the real space corresponding to a joining portion where the bird's-eye-view images 216 and 218 are joined to each other, as shown in FIG. 10, an image 203 corresponding to the object can be displayed by decreasing the width of a line-image 246 corresponding to a joining portion where the bird's-eye-view images 216 and 218 are joined to each other of a line image 242 corresponding to a joining portion where the bird's-eye-view images 212 and 214 are joined to each other, a line image 244 corresponding to a joining portion where the bird's-eye-view images 214 and 216 are joined to each other, the line image 246 corresponding to the joining portion where the bird's-eye-view images 216 and 218 are joined to each other, and a line image 248 corresponding to a joining portion where the bird's-eye-view images 218 and 212 are joined to each other and/or changing the width of the line image 246 based on the amount of change in the posture of the vehicle 200. Accordingly, the driver can identify what shape the object has and in which position the object exists.

Further, according to the above-described embodiment, both the first and second line images are generated and either of them is selected, as shown in FIG. 8. However, only the first line image may be generated by performing the operations corresponding to steps S201 to S203. Otherwise, only the second line image may be generated by performing the operations corresponding to steps S204 to S206.

As described above, an image-processing system according to an embodiment of the present invention can monitor the periphery of a vehicle with increased reliability, and serves a useful function, as an image-processing system and an image-processing method.

It is intended that the foregoing detailed description be regarded as illustrative rather than limiting, and that it is understood that it is the following claims, including all equivalents, which are intended to define the spirit and scope of this invention.

What is claimed is:

1. An image-processing system operative to process image data obtained by capturing images outside a periphery of a vehicle, the image-processing system comprising:
a plurality of image-capturing units that is affixed to the vehicle and that generates image-data items by capturing images outside the periphery of the vehicle;
a bird's-eye-view-image-drawing unit configured to generate a bird's-eye-view image by determining a viewpoint above the vehicle for each of the image-data items generated by the image-capturing units based on the image-data item so that end portions of real spaces corresponding to two adjacent bird's-eye-view images overlap each other;
an image-composition unit configured to generate a bird's-eye-view-composite image by combining the bird's-eye-view images with one another according to a predetermined layout;
an object-detection unit configured to detect at least one object existing in at least one real space corresponding to at least one joining portion where the bird's-eye-view images included in the bird's-eye-view-composite image are joined to each other;
a border-width-setting unit configured to determine a border image based on the overlap portions of the bird's-eye-view images included in the bird's-eye-view-composite image, the overlap portions being included in the joining portion, and to change a width of the border image when the object-detection unit detects at least one object existing in a real space corresponding to the overlap portion; and
an image-addition unit configured to generate a border-and-bird's-eye-view-composite image in the joining portion by superimposing a border image having a width set by the border-width-setting unit on the overlap portion of one of the bird's-eye-view images;
wherein the object-detection unit includes a sensor that is provided for each of the at least one real space corresponding to the at least one joining portion, the sensor operative to detect the at least one object existing in the real space,
wherein the border-width-setting unit sets the width of the border image to a value smaller than an initial value when the object-detection unit detects the object existing in the real space corresponding to the joining portion, and
wherein when generating the overlap portions of the bird's-eye-view images, the image-composition unit is configured to determine a bird's-eye-view image corresponding to the image-data item generated by the image-capturing unit having a more narrow view angle than the other image-capturing units generating the image-data items corresponding to the bird's-eye-view images to be the other bird's-eye-view image, and to draw the overlap portion of the other bird's-eye-view image with priority.

2. The image-processing system of claim 1, further comprising:
 a frame memory configured to store image data corresponding to an image for display,
 wherein the image-composition unit stores image data corresponding to each of the bird's-eye-view images drawn by the image-drawing unit in a predetermined storage area determined for each of the bird's-eye-view images, the predetermined storage area being provided in the frame memory, and
 wherein the image-addition unit stores image data corresponding to the border image in a predetermined storage area determined for each of the border images, the predetermined storage area being provided in the frame memory.

3. The image-processing system of claim 2, further comprising:
 a mapping memory configured to store data on a mapping table showing an association between a position of each of pixels of the bird's-eye-view image generated by the image-drawing unit and a storage area provided in the frame memory,
 wherein the image-composition unit stores image data on each of pixels corresponding to the bird's-eye-view image drawn by the image-drawing unit in a predetermined storage area provided in the frame memory based on the mapping table.

4. The image-processing system of claim 1, wherein the plurality of image-capturing units comprises:
 a first image-capturing unit capturing an image of an area ahead of the vehicle;
 a second image-capturing unit capturing an image of an area on the right of the vehicle;
 a third image-capturing unit capturing an image of an area in the rear of the vehicle; and
 a fourth image-capturing unit capturing an image of an area on the left of the vehicle.

5. An image-processing method to process image data obtained by capturing images outside a periphery of a vehicle, the image-processing method comprising the steps of:
 capturing images outside the periphery of the vehicle by using a plurality of image-capturing units affixed to the vehicle and generating image-data items;
 generating a bird's-eye-view image by determining a viewpoint above the vehicle for each of the image-data items generated at the image-capturing step based on the image-data item so that end portions of real spaces corresponding to two adjacent bird's-eye-view images overlap each other;
 generating a bird's-eye-view-composite image by combining the bird's-eye-view images with one another according to a predetermined layout;
 detecting at least one object existing in at least one real space corresponding to at least one portion where the bird's-eye-view images included in the bird's-eye-view-composite image are joined to each other;
 generating a border image based on the overlap portions of the bird's-eye-view images included in the bird's-eye-view-composite image, the overlap portions being included in the joining portion, and changing a width of the border image when at least one object existing in a real space corresponding to the overlap portion is detected at the object-detection step, wherein changing the width of the boarder image comprising setting the width of the boarder image to a value smaller than an initial value; and
 generating a border-and-bird's-eye-view-composite image in the joining portion by superimposing a border image having a width set at the border-width-setting step on the overlap portion of one of the bird's-eye-view images;
 wherein generating the overlap portions of the bird's-eye-view images comprises determining a bird's-eye-view image corresponding to the image-data item generated by the image-capturing unit having a more narrow view angle than the other image-capturing units generating the image-data items corresponding to the bird's-eye-view images to be the other bird's-eye-view image, and drawing the overlap portion of the other bird's-eye-view image with priority.

* * * * *